S. F. WEITMAN.
WEED CUTTER.
APPLICATION FILED JUNE 30, 1916.

1,222,701.

Patented Apr. 17, 1917.

Inventor
S. F. Weitman

UNITED STATES PATENT OFFICE.

SOLOMON F. WEITMAN, OF LIVE OAK, FLORIDA.

WEED-CUTTER.

1,222,701.

Specification of Letters Patent.

Patented Apr. 17, 1917.

Application filed June 30, 1916. Serial No. 106,810.

*To all whom it may concern:*

Be it known that I, SOLOMON F. WEITMAN, a citizen of the United States, residing at Live Oak, in the county of Suwanee, State of Florida, have invented a new and useful Weed-Cutter; and I do hereby declare the following to be a full, clear, and exact description of the invention, such as will enable others skilled in the art to which it appertains to make and use the same.

This invention relates to the art of farming implements and machines, and more especially to a new and useful weedcutting or chopping machine having an improved weed cutting or chopping cylinder or roll, mounted in the frame of the machine and rotated by the driving axle of the driving wheel.

One of the objects of the invention is the provision of an improved weed cutting or chopping roll having means, whereby, when the blades are arranged upon the body of the roll, they will be held equally spaced.

Another object of the invention is to provide a device of this kind, whereby, when said above means is adjusted, said cutting or chopping blade may be bowed, to more readily facilitate the cutting or chopping of the weeds.

Another object of the invention is the provision of end plates on the roller or cutter, whereby the inclination of the cutting or chopping blades may be increased or decreased, to increase or decrease their shearing action.

In practical fields the details of construction may necessitate alterations falling within the scope of what is claimed.

The invention comprises further features and combination of parts, as hereinafter set forth shown in the drawings and claimed.

In the drawings:—

Fig. 2 is a top plan view partly in section of the improved machine.

Fig. 3 is a detail perspective view of the cutting or chopping roller.

Fig. 4 is a cross section view on line 4—4 of Fig. 3.

Figure 1:
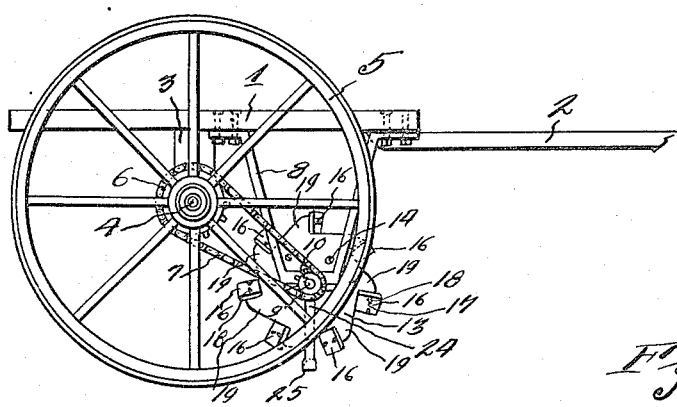
Figure 1 is a view in side elevation of the improved weed cutting or chopping machine constructed in accordance with the invention.
Figure 1:
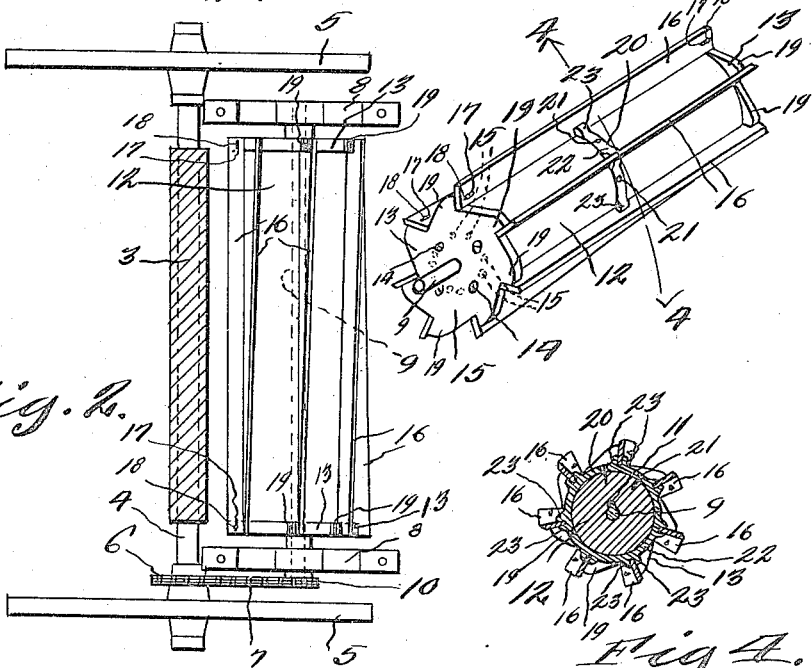
Figure 1:
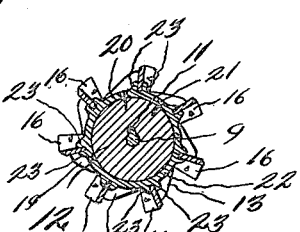

Referring more especially to the drawings 1 designates a suitable frame provided with a suitable draft tongue 2, and a downwardly extending bearing member 3 for the reception of the drive axle 4, on which the supporting drive wheels 5 are mounted. Carried by one of the drive wheels is a suitable sprocket 6 having a sprocket chain 7 traveling about the same. Depending from the frame 1 from opposite sides thereof are two bearing brackets 8, in bearings of the lower ends of which a suitable shaft 9 is mounted. One end of the shaft 9 has a sprocket 10, which is engaged by the sprocket chain 7. Fixed to the shaft 9 by means of a key or feather 11 is a body 12 of the cutting roller or cylinder. Secured axially on the ends of the body of the cylinder or roller are disk plates 13, the securing screws 14 of which may so coöperate with the apertures or depressions 15 in the ends of the body or cylinder, that said plates or disks may be so adjusted, as to increase or decrease the inclination of the cutting blades 16, which extend radially from the body of the cylinder or roller, so as to increase or decrease the shearing action of said blades. The blades 16 are provided with elongated openings or slots 17 near their extremities for the reception of the screws 18 (which secure the blades to the projections 19 of said disk plates) to compensate for the adjustment of the disk plates. Extending about the body of the cutting roller or cylinder substantially midway the ends thereof, and seated in an annular recess 20 of the body and adjustably secured by the screw 21 is an annular band 22 having radial projections 23 arranged in pairs and spaced apart. In the space between each two spaced projections a cutting or chopping blade is arranged, therefore by virtue of these projections the cutting or chopping blades are held at equal distances apart, which is more especially desired when securing the disk plates in their positions. Before securing the screws 18 in place the blades are held frictionally between their respective spaced projections 23. It is to be noted that the band 20 may be adjusted annularly, whereby the blades may be bowed from one direction to the other. Carried by downwardly projecting arms 24 of the frame of the machine is a shearing bar 25, with which the cutting blades coöperate, so as to more readily insure shearing and cutting action on the weeds or the like.

The invention having been set forth what is claimed as new and useful is:

1. A cutting or chopping roller for a weed cutting machine comprising a cylindrical body, axially adjustable disk plates secured to the ends of the body and having projections, cutting blades arranged on the body inclined with relation to the length of the cylinder and extending radially and provided with slot and pin connection to said projections.

2. A cutting or chopping roller for a weed cutting machine comprising a cylindrical body, axially adjustable disk plates secured to the ends of the body and having projections, cutting blades arranged on the body inclined with relation to the length of the cylinder and extending radially and provided with slot and pin connection to said projections, and means carried by the central part of the body for holding the central portions of the blades at equal spaced intervals apart.

3. A cutting or chopping roller for a weed cutting machine comprising a cylindrical body, axially adjustable disk plates secured to the ends of the body and having projections, cutting blades arranged on the body inclined with relation to the length of the cylinder and extending radially and provided with slot and pin connections to said projections, adjustable means carried by the central part of the body for holding the central portion of the blades at equal spaced distances apart, said means comprising an annular recess in the body, an annular band adjustably secured in said annular recess and having projections between which said blades are frictionally held.

In testimony whereof I have signed my name to this specification in the presence of two subscribing witnesses.

SOLOMON F. WEITMAN.

Witnesses:
J. M. STRICKLAND,
H. A. HORNES.

Copies of this patent may be obtained for five cents each, by addressing the "Commissioner of Patents, Washington, D. C."